July 9, 1946.    C. M. HAYMAN    2,403,658
GYROSCOPIC STEERING MECHANISM
Filed Nov. 21, 1944    2 Sheets-Sheet 1

INVENTOR.
Charles M. Hayman
BY Warren S. Orton.
ATTORNEY

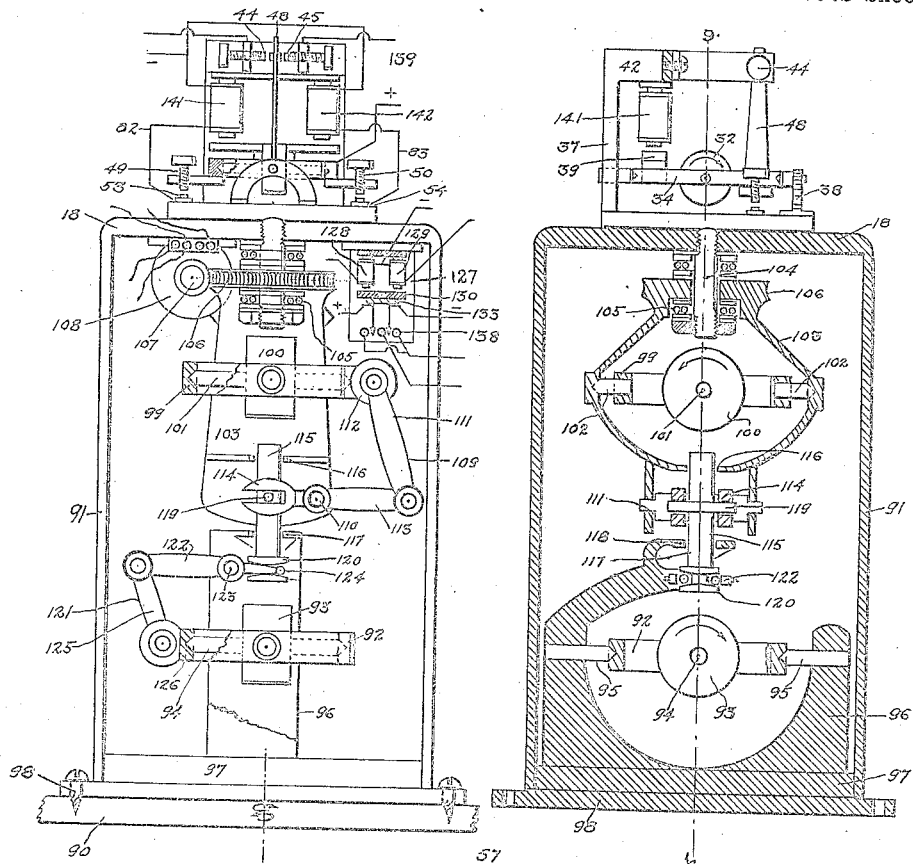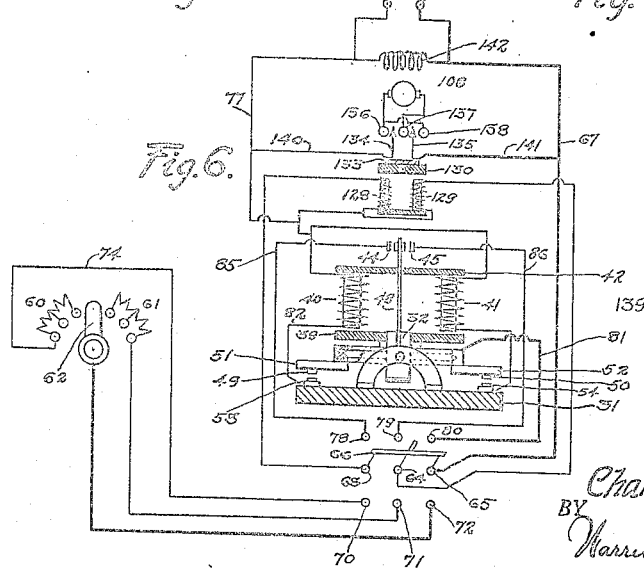

Patented July 9, 1946

2,403,658

UNITED STATES PATENT OFFICE 2,403,658

GYROSCOPIC STEERING MECHANISM

Charles M. Hayman, Brooklyn, N. Y.

Application November 21, 1944, Serial No. 564,494

34 Claims. (Cl. 114—144)

The invention relates to gyroscopically actuated mechanism for turning a craft in space under conditions where the craft may even be rudderless and thus independent of the presence of any factor of headway or drift.

While the invention is herein specifically described as a control for a navigable craft, it can be used for controlling the rotation of any body in space and for specific instances it may be used to rotate a motion picture camera, a searchlight, a submarine, a torpedo, a large gun turret, a roundhouse turntable.

The primary object of the invention is to provide a simplified craft turning or steering mechanism which will be easy to operate to effect a turn selectively to the right or left at will; which will automatically intercept its turning movement when the turning is intercepted as by contact with an external object and which will automatically resist any lateral turning of the craft under the infence of any external causes, such as cross current and side winds, and which will tend to maintain its course if under headway and resist forces which tend to turn it off its course.

Broadly, the invention features the mounting of a steering gyroscope on a craft with the craft providing the third degree of freedom of rotation and the gyroscope itself providing the other two degrees of rotational freedom; and control means for displacing the gimbal ring to create a precessional movement of the steering gyroscope. This control means may be manually actuated to effect a steering of the craft at will, or it may be automatic and governed by the movement of the craft itself as when veered off its course by external influences.

In devices of this character where powerful precessional forces are developed by the gyroscope, provision must be made to prevent such forces from wrecking the device, and accordingly, another object of the invention is to provide for an automatic release to disconnect the gyroscope from the craft in the event of excessive forces being developed by the gyroscope by reason of powerful outside forces acting on the craft.

Broadly, this aspect of the invention is attained by mounting the main gyroscope on a turntable which is normally locked to the craft which it controls, but which on an abnormal precessional movement of the gyroscope releases the connection between the gyroscope and the craft and thus intercepts the automatic steering and permits of a manual control to right the craft and thus permit the restoration of the automatic control by the gyroscope.

Various other objects and advantages of the invention will be in part obvious from a consideration of the method features of the disclosure and from an inspection of the accompanying drawings, and in part will be more fully set forth in the following particular description of one method of practicing the invention, and the invention also consists in certain new and novel modifications of the preferred method and other features of construction and combination of parts hereinafter set forth and claimed.

Figure 3:
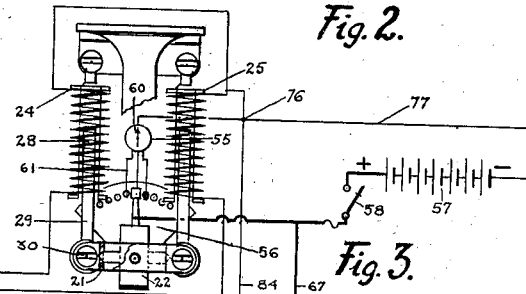
Figure 7:
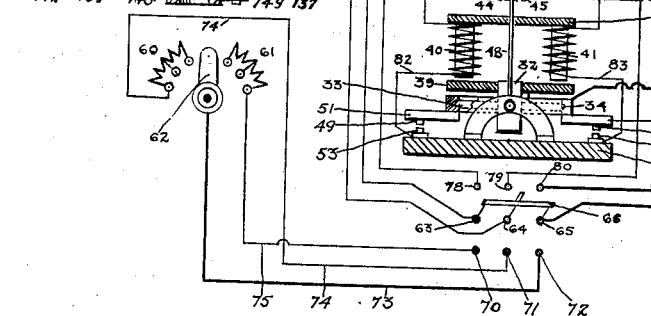

Figure 3 is a wiring diagram of some of the parts shown in the preceding figures and with certain additional electrical parts all shown in their normal inoperative positions; and Figures 4–6 disclose a modified form of the invention, Figure 4 being a view largely in front elevation of the modified form; and Figure 5 being a view largely in vertical axial section at right angles to the showing in Fig. 4; and Figure 6 being a wiring diagram of the circuits of the modified form, and Figure 7 shows a modified form of gyroscope mounting.

Figure 2:
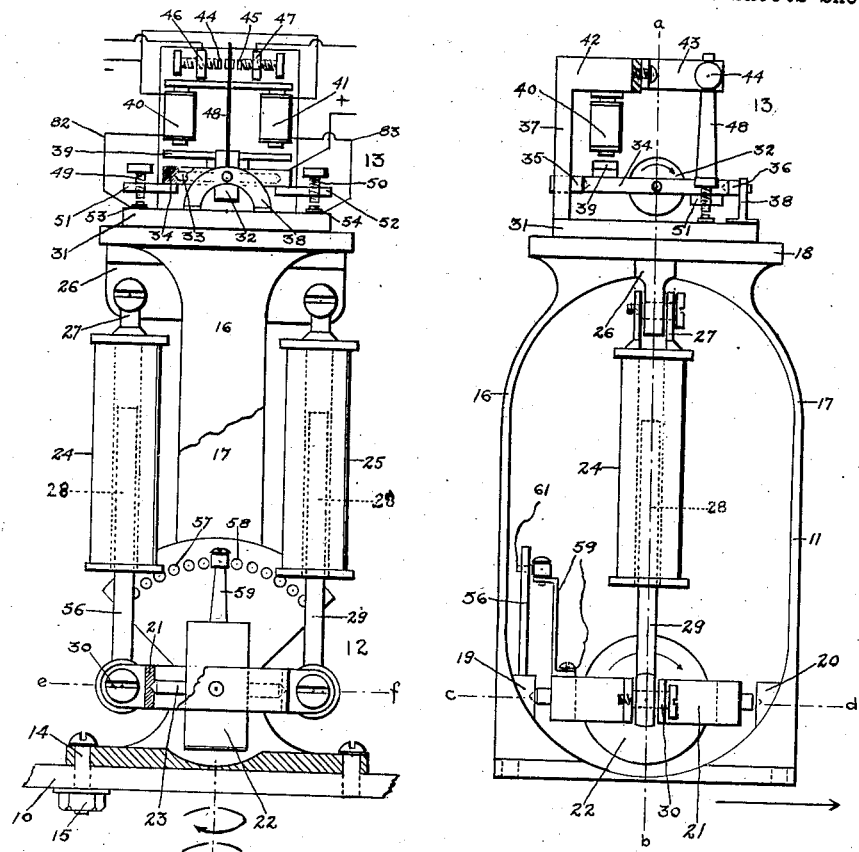
Figure 2 is a view in side elevation of the device shown in Figure 1.
Figure 1:
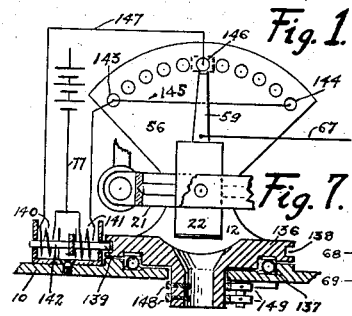
Figure 1 is a view largely in front elevation of a preferred embodiment of the invention installed in position on a ship shown symbolically by a structural part thereof.

Referring first to the form of the invention disclosed in Figures 1–3, there is disclosed a freely floating body such as a ship, an airplane or other craft to be steered and represented symbolically by structural part thereof designated 10 in Figure 1. It is understood that insofar as this disclosure is concerned, the craft may be free of rudders or if it possesses a rudder, it may be either locked in inoperative position or it may be used conjointly with the apparatus herein featured. As this body when floating is free to turn in a horizontal plane about a vertical axis $a$—$b$ it will thus constitute one of the three degrees of freedom of movement of the gyroscope or gyroscopes herein featured. In the present disclosure let it be assumed that the craft when moving forward is moving in the direction indicated by the long arrow at the bottom of Figure 2, that is, from left to right of the sheet. A binnacle or housing 11 of jar-like form is rigidly secured to the part 10 and provides a support for two gyroscopic devices 12 and 13, of which device 12 is to be regarded hereinafter as a main gyroscopic control and the device 13 a gyroscopically controlled relay for keeping the craft on a straight away course. The binnacle includes a rugged base 14 secured to the structural part of the craft 10 by means of bolts 15 and upstanding sides 16 and 17 merging at their upper ends with a flat top platform 18.

Referring first to the main gyroscopic control 12, there is disclosed at the bottom of the housing as shown in Fig. 2 a pair of rugged trunnions 19 and 20 rigid with the frame and this rigid with the ship 10. A gimbal ring 21 is journalled conventionally in the trunnions and is normally disposed in a horizontal plane and mounted for oscillatory movement about an axis of spin shown at c—d in Fig. 2, and thus provides the first freedom of movement for the gyroscope. Journalled in the gimbal ring is a spinning rotor 22 whose axle 23 extends at right angles to the axis c—d and thus provides a second freedom of movement of the gyroscope about the second axis e—f. When mounted on a craft, rolling or pitching of the craft does not affect the rotor if the gyroscope is mounted with the spinning axis athwart a ship, that is, at right angles to the direction of the long arrow in Fig. 2. It is the intent that the rotor 22 as well as the rotors hereinafter referred to be turning at high R. P. M. by jet propulsion or by any other known means at present used for rotating the spinning rotors of gyroscopes and accordingly no specific motor power for turning the gyroscopic rotors is herein disclosed.

Means are provided for shifting the gimbal ring about the axis c—d and this against the resistance of its spinning rotor. For this purpose there are disclosed two main solenoids, a left main solenoid 24 and a right main solenoid 25 as viewed in Fig. 1. The left solenoid 24 is on the starboard side of the craft and the right solenoid 25 is on the port side of the craft considering that the arrow of Fig. 2 is pointing forward. These solenoids depend from a cross bar 26 forming a part of the upper portion of the binnacle 11; have their upper ends connected thereto through pivotal hangers 27 and have their cores 28 connected by links 29 with opposite portions of the gimbal ring 21 in line with the rotor axle 23. The connection is by means of pivotal connections 30 best shown in Figure 2.

It is within the scope of the disclosure to cause the gimbal ring 21 to dip downwardly from its normal horizontal position at either side by the selective energizing of one or the other of the solenoids and thus cause a tilting of the spinning rotor 22. As so organized, the craft will respond to any such displacement of the spinning rotor by turning towards the side to which the ring is tilted and in this way the craft may be steered by rotating clockwise or counterclockwise, that is, towards starboard or towards port about the vertical axis a—b passing through the center of mass of the spinning rotor.

Device 13 includes a base 31 mounted on top of the platform 18 and rigidly secured thereto. Base 31 supports a high speed spinning rotor 32, the axle 33 of which is journaled in a gimbal ring 34 which is normally disposed in a horizontal plane and is in turn journaled in a pair of trunnions 35 and 36 carried by fixed supports 37 and 38 upstanding from the base 31. The axle 33 normally extends parallel to the axle 23 and thus parallel to the line e—f. The gimbal ring 34 has its axis normally disposed parallel to the line c—d. The ring 34 is provided with a metallic plate 39 forming an oscillating armature for a pair of servo electro-magnets 40 and 41 secured to a head piece 42 overlapping the same and carried by the support 37. The electro-magnet 40 will be referred to hereinafter as the left electro-magnet and the electro-magnet 41 as the right electro-magnet.

Secured to the headpiece 42 is a bracket 43 carrying a pair of relatively fixed contacts 44 and 45 each in the form of a set screw threaded respectively into terminal bars 46 and 47 and disposed for relative adjustment. An upstanding rockable contact bar 48 has its lower end secured to the ring 34 to swing therewith and has its upper end located to move between and to engage selectively either one of two fixed contacts 44 or 45 and operating to close a main solenoid circuit through that solenoid 24 or 25 towards which bar 48 is shifted by the tilting of the gimbal ring 34. The tilting of the ring 34 also opens and closes a circuit through a pair of contacts, the shiftable elements 49 and 50 of which are carried respectively by extensions 51 and 52 from the gimbal ring 34 in line with its spinning rotor axis. A pair of fixed contacts 53 and 54 coact respectively with movable contacts 49 and 50 to selectively close circuits hereinafter described in discussing Figure 3.

It is within the scope of the disclosure to provide a remote indicator 55 for displaying to the operator a visual indication of the tilt of the main gyroscope gimbal ring 21 and for this purpose there is disclosed a segment shaped contact plate 56 provided with a plurality of button contacts grouped in a series of left contact buttons 57 and a series of right contact buttons 58 arranged in an arc and adapted to be engaged by the sweep of a contact arm 59 carried by the gimbal ring as best shown in Figure 2. An indicator pointer, 60, is connected electrically to the several buttons as is suggested by the wiring 61 of two of the buttons in Figure 3, and the connection is so arranged that the pointer will swing right or left according to the corresponding tilt of the gimbal ring 21 and will swing right or left proportionate to the offsetting from normal of the ring as the contact arm 59 engages succeeding buttons.

Directing attention first to the wiring associated with the parts thus far described, reference is made to Figure 3, wherein there is disclosed additional to the parts previously described a source of electric energy 57, a main control switch 58, a 3-way double control switch 66 and a pair of selective potentiometers 60 and 61 having a manually actuated lever control 62 all disposed convenient to the operator.

The knife blade switch 66 includes three contacts 63, 64 and 65 disposed in line and to each of which is connected an element of the manually operated movable element 66.

From the left or positive side of the source 57, assuming main switch 58 to be closed, current is led to the contact 65 through main lead 67. Contact 64 is connected to the winding of the left main solenoid 24 by means of a conductor 68. Contact 63 is connected to the windings of the right main solenoid 25 by means of a conductor 69.

Opposite the contacts 63, 64 and 65 and connected respectively thereto when the control 66 is in its lower position are three potentiometer contacts 70, 71 and 72. Contact 72 is disposed to receive current from contact 65 and thus from the main lead 67 and current is supplied to the control 62 through conductor 73. Contact 71 leads by means of conductor 74 to the intake end of the left potentiometer 60 and contact 70 leads by means of conductor 75 to the right potentiometer 61.

Assuming then that the main switch 58 is closed and that control 66 is in its lowered position and that control 62 has been moved by the operator, say to the right, progressively across the several contact buttons of the right potentiometer 61, the ship will be caused to turn to the right about its vertical axis $a-b$. To effect this the current can be traced from the positive side of the source 57, through conductor 67, contacts 65—72, conductor 73, control 62, potentiometer 61, conductor 75, contacts 70—63, conductor 69, windings of right solenoid 25 and back to the right or negative side of the source through juncture point 76 and main return lead 77.

Energizing the right solenoid 25 causes it to draw its core more fully into its windings and thus acts to elevate the right side, and by the same token depresses the left side of the main gimbal ring 21 as viewed in Fig. 1. This displacement of the gimbal ring is of course resisted by its spinning rotor and by reaction the ship turns about the vertical axis $a-b$ and in this case the turn is to the right, that is, clockwise looking down on the binnacle or towards the depressed side of the gimbal ring. Differently expressed, looking down on the long arrow in Fig. 2 its head will turn to the right or to starboard, that is, towards the side which is the depressed side of the gimbal ring. This turning movement of the ship will continue as long as the active solenoid is resisting the return of the spinning rotor to its original plane and the ship will gradually increase its rate of turning with increase in lapsed time while the gimbal ring is so held in its tilted or depressed position.

Moving the contact 62 by manual action back to its normal neutral position permits the gyroscope to restore itself to its normal position by virtue of the continued rotation of the ship. Similarly the shifting of the control 62 to the left to bring potentiometer 60 into circuit closing position will lead current therefrom through conductor 74, contacts 71—64, conductor 68, windings of left solenoid 24 and back to source through main return lead 77. This has the effect of tipping the right side of the gimbal ring downwardly and thus cause the ship to turn counterclockwise or to the left or to port, pivoting about its self-contained vertical axis $a-b$.

Completing the description of the double throw switch 66 it will be seen from Fig. 3 that it also includes three other contacts 78, 79 and 80 disposed in line and arranged respectively opposite the contacts 63, 64 and 65. The several contacts are so arranged that when the shiftable member is moved into its upper position as viewed in Figure 3, the contacts will be connected 63 with 78, 64 with 79 and 65 with 80.

Should it be desired to place the ship under automatic control so as to keep it on its course, the shiftable element 66 is thrown into its upper position to engage the upper line of the three contacts 78, 79 and 80. Under these conditions live contacts 65 and 80 are connected and current is led by conductor 81 to the gimbal ring 34 and through the bars 51 and 52 and thus to the shiftable contact elements 49 and 50 of the electromagnet circuit closers. Contact 54 leads by means of conductor 83 to one end of the windings of right electro-magnet 41. Contact 53 leads by means of conductor 82 to one end of the windings of left electro-magnet 40. The opposite ends of the electro-magnets 40 and 41 are connected by branch lead 84 with juncture point 76 and thus through main return lead 77 to the right side of source 57. Contact 78 is connected with contact 44 of the main solenoid circuit closer by conductor 85 and contact 79 is connected with the other fixed contact 45 of the main solenoid circuit closer by means of conductor 86. Contacts 48 and 45 or 48 and 44 are made before contacts 50 and 54 or 49 and 53 are made. Contacts 50—54 or 49—53 are for bringing the small control gyro 32 back to horizontal, thus only giving momentary contact to 48 and 45 or 48 and 44.

In operation, with the device in its automatic running position, let it be assumed that external forces are acting on the ship and tending to cause it to veer off its course, say to the right; this turning of the ship causes the more sensitive control or relay gyroscope to tilt its gimbal ring 34 about its axis lowering its right side and, of course, elevating its left side.

This tilting of the ring 34 to the right from the showing in Figure 3 closes the contacts 48 and 45. The current will then be from the energized ring 34, contacts 48 and 45, conductor 86 to switch contact 79 across to contact 64, conductor 68 to left main solenoid 24, juncture 76 and return lead 77 back to source 57. The main solenoid 24 so powered will cause the main gyro 22 to be tilted to the right, thus causing the ship to turn to the left, thereby returning the ship to its original course, the course headed for before external forces caused it to veer to the right.

If the external forces tend to cause the ship to veer to the left, the small control gyroscope tilts the gimbal ring 34 about its axis lowering its left side and of course elevating its right side. This tilting of the gimbal 34 closes the contacts 48 and 44. The current will then be from the energized ring 34, contacts 48—44, conductor 85, switch contact 78—63, conductor 69, main right solenoid 25, juncture point 76 and return lead 77 back to source 57. The main right solenoid 25 so powered will cause the main gyro 22 to be tilted to the left, thus causing the ship to turn to the right, thereby returning the ship to its original course headed for before external forces caused it to veer to the left.

The electro-magnets 40 and 41 of device 13, actuated by contacts 50 and 54, 49 and 53 are simply for restoring the small control gyro 32 to a horizontal position after having momentarily contacted 48—45 or 48—44.

It has been found that if a second rotor is linked to the main gyroscopic rotor, a more flexible force can be utilized to displace the main gimbal ring, and such a modified form of the invention is disclosed in Figures 4–6. There is shown at 90 a part of a ship corresponding to part 10 and a binnacle 91 corresponding to the binnacle 11 of Figures 1 and 2. Mounted in the bottom of binnacle 91 is a main gyroscope gimbal ring 92 and in which ring is mounted a spinning rotor 93 turning on axle 94. The ring 92 is carried by trunnions 95 in turn carried by a heavy hollow casting 96 carried by a plate 97 disposed on the bottom 98 of the binnacle.

Positioned in the upper portion of the binnacle is a second gimbal ring 99 in which is mounted a spinning rotor 100 turning on its axle 101. The trunnions 102 supporting the ring 99 are carried by a hollow support 103 journaled for rotary movement about a vertical axis $g-h$ and which corresponds to the axis $a-b$ in the form of the invention disclosed in Figures 1-3. The support 103 is suspended from the platform 18 on a stub shaft 104 and is mounted in antifriction devices 105 to facilitate ease of turn of the support. The upper portion of the support is provided with a worm gear 106 in mesh with a worm shaft 107 forming an extension from the shaft of a reversing electric motor 108 suspended from the under side of the platform 18. The two gimbal rings 92 and 99 are interconnected to tilt in unison through a connecting linkage extending from one side of one ring to the opposite side of the other ring. For this purpose an upper bell crank lever 109 on the right side of Figure 4 is fulcrumed at 110 to the support 103. Lever 109 has its upper arm 111 pivoted to an extension 112 projecting radially from ring 99. The lower arm 113 of bell crank lever 109 extends horizontally, has its free end 114 bifurcated. The upper end of a lift rod 115 is guided for vertical movement through an aperture 116 provided therefor in the bottom of the support 103 and its lower end is guided in an aperture 117 formed in a ledge 118 integral with the casting 96. A pivot pin 119 passes through rod 115 and the bifurcation at 114. The lift rod has its lower end in the form of a spool collar 120 and forms an annular yoke.

On the lower left side of Figure 4 there is shown a bell crank lever 121 which has its upper horizontal arm 122 fulcrumed at 123 and its inner end bifurcated to form fingers 124 riding in the spool collar 120. The other arm 125 of the bell crank lever depends from the arm 122 and is pivotally connected to an extension 126 projecting laterally from the lower ring 92.

From this construction it is obvious that a tilt originating in either gimbal ring 92 or 99 causes the other gimbal ring also to tilt, but in the opposite direction. For instance, assume the right side of ring 99 to be depressed; this will lower arm 109, rotate arm 113 about its fulcrum 110 and elevate the forked end 114. This will elevate the lift rod 115, rock arm 122 about its fulcrum 123, lower arm 121 and thus lower the left side of the ring 92. The two rings will then be moved from their normal horizontal position, one clockwise and the other counterclockwise, with the rings disposed in intersecting planes.

Included in the circuit which controls motor 108 and controlling the same is an armature reversing relay 127 depending from the underside of the platform 18 as shown at the upper side of Fig. 4. This relay is for the purpose of controlling the direction of rotation of the motor 108 and thus the direction in which the motor turns the support 103. Turning the support 103 in one direction will cause the gimbal rings 92 and 99 to tilt one in one direction and the other in the opposite direction as above indicated; that is, with the rotors spinning in the reverse directions indicated thereon in Fig. 5 a turning of the support clockwise as you look down on the same will cause the gimbal ring 99 to dip on the right side and similarly the actuation of the motor in a direction to cause the support to turn counterclockwise will therethrough effect the gimbal ring 99 to cause it to dip down on its left side.

The relay includes a pair of electro-magnets 128 and 129 having a pivotally mounted armature 130. The armature 130 is of iron and carries a plate 133 of insulating material and on which is rigidly fixed a pair of movable contacts 134 and 135 shown upstanding in Fig. 6 and depending in Fig. 4. These movable contacts are designed to coact selectively with two of three fixed relay contacts 136, 137 and 138 depending on the direction of tilt of the armature 130. The several contacts are so arranged that when the armature is shifted to cause contacts 134 and 135 to engage respectively with contacts 136 and 137 the motor turns in one direction, and when contacts 134 and 135 are shifted to engage respectively with contacts 137 and 138, the direction of rotation of the motor is reversed.

The modification of Figs. 4-6 also includes a gyro control relay 139 corresponding in all respects to the relay disclosed in Figs. 1-3 except that conductor 69 leads to electromagnet 128 instead of to solenoid 24, and conductor 68 leads to electromagnet 129 instead of to solenoid 25, and the wiring associated therewith is otherwise identical with and similarly designated in both Figs. 3 and 6.

Further referring to the wiring diagram in Fig. 6 contact 134 is connected to lead 77 by means of a conductor 140, and contact 135 is connected to lead 67 by means of a conductor 141. Also field windings 142 of motor 108 are shunted across leads 67 and 77.

Referring to the operation of the device disclosed in the Figs. 4-6 form and assuming movable switch element 66 is in its lowered position engaging contacts 70, 71 and 72, then electromagnet 129 is powered when lever 82 is moved across potentiometer 81 or electro-magnet 128 is powered when lever 82 is moved across potentiometer 80. When electro-magnet 129, for instance, is energized, it rocks its armature 130 with its right side depressed as viewed in Fig. 6 and thus shifts contacts 134 and 135 towards the right to close the circuit through the motor to turn it in one direction. The motor rotates the support 103 and this tilts the gimbal rings 99 and 92 in a manner similar to the tilting of the gimbal ring 21 by solenoids 24 and 25 in the Figs. 1-3 form of the disclosure. Similarly when electro-magnet 128 is energized by the closing of contacts 60, 62 and this tilts armature 130 downwardly to the left and through the shifting of contacts 134 and 135 to the left the motor turns in the opposite direction, the support 103 turns in the opposite direction, and the rotor 100 tilts in the opposite direction.

Referring to the operation of the device disclosed in Figures 4-6 when the movable switch element 66 is in its upper position engaging contacts 78, 79 and 80, the device operates as described for the similar disposition of the element 66 in the Figures 1-3 form of the invention, except that in Figure 3 contact 63 goes to solenoid 25 while in Figure 6 contact 63 goes to electromagnet 128. Also in Figure 3 contact 64 goes to left solenoid 24 while in Figure 6 contact 64 goes to right electro-magnet 129. In general, the distinction between the form of the invention disclosed in Figures 1-3 and the form disclosed in Figures 4-6 is that in the former case the main gimbal ring 21 was tilted right or left by the action of the solenoids 24 and 25, while in the latter case the main gimbal ring 99 was tilted by the rotation of the support 103.

The steering device herein disclosed acts directly on the craft and thus needs no rudders, ailerons or other externally acting steering means. The disclosure therefore features the minimizing of structural parts. The craft may be turned about the axis $a$—$b$ or $g$—$h$ in either direction at will and on even keel and stopped immediately by discontinuing the applied force to the steering gyroscope. By discontinuing the applied turning force on the steering gyroscope, the precessional force on the steering gyroscope caused by the turning in space of the craft (which force is opposite the applied force) permits the steering gyroscope to precess towards the horizontal, thereby applying to the craft a torque opposite to the turn, hence dampering the applied turn. In the event the craft is a ship and is turned in a narrow slip and the ship accidentally collides with a pier or other obstacle, the gyroscopic force that caused the turning does not continue to exert such force in the direction of the obstacle but stops immediately and the helmsman can then manually cause a force to be applied through the steering gyroscope to turn the craft in the opposite direction away from the obstacle.

The reason the ship does not continue to exert a force in the direction of the obstacle collided with is due to the fact that the main gyro (by applied force) was overcoming the precessional force acting upon it caused by the ship's turning. When the turning of the ship ceases, the precessional force ceases, the main gyro having no force to oppose, dips to the limit against the bumper at the binnacle, delivers no further torque to the ship, therefore the ship ceases to turn in the direction of the obstacle collided with.

Under some unusual conditions the main gyroscope tilts to the limits of its movement in engagement with its bumper or other stop as when the craft is acted upon by forces resulting from extra heavy cross currents or heavy winds. Under these conditions it is suggested that it is advisable to provide a mounting for the assembly which will permit the mounting of the gyroscope to rotate under such excessive tilts of the main gyroscope in either direction and which will lock the assembly automatically in its normal fixed position when the gyroscope rotor returns to its normal plane of rotation. One such mounting is disclosed in Figure 7 where the base 10 forming part of the craft to be steered has mounted thereon a turntable 136 on which the main gyroscope 12 is mounted. Anti-friction devices 137 facilitate the turn of the turntable. Normally the turntable is restrained from rotating relative to the craft on which it is mounted. For this purpose the peripheral edge of the turntable is provided with a line of stop holes 138 adapted to be engaged selectively by a dog or bolt 139 acting to lock the turntable against rotation except under those conditions where rotation is desired to release the gyroscope from excessive self-imposed strains. The bolt is controlled by a pair of solenoids, a locking solenoid 140 and an unlocking solenoid 141. The solenoids have a common core 142, one end of which forms the bolt 139.

In this case the segment contact plate 56 has its end buttons marked 143 and 144 and connected by means of conductor 145 with one end of the unlocking solenoid 141. The middle button 146 is connected by conductor 147 with one end of the locking solenoid 140. The opposite ends of the solenoids 140 and 141 are connected by lead 77 to the negative side of the source 57 and the positive side of the source is connected to the contact arm 59 as previously described. Collector ring 148 and brush 149 lead current to the apparatus.

In the event the outer forces are sufficiently great to cause a depression of the main gyroscope ring 21 to its limit of movement in either direction, the contact arm engages either button 143 or 144 depending on the direction of tip of the gimbal ring. In either case the circuit is completed through the unlocking solenoid 141 which acts to move the latch 139 to the left of the showing in Figure 7, thus releasing the turntable from any further gyroscopic affected movement thereof. The operator can thus cause the whole assembly to turn by throwing the manual switch 62 in that direction which will cause the gyroscope to tilt in the opposite direction.

The resulting turning of the whole assembly will cause the main gyroscope ring to precess back to its normal horizontal position without affecting any torque on the craft.

When the contact arm reaches the middle button 146, the locking circuit is closed through the locking solenoid 140, and, of course, the circuit through the unlocking solenoid is broken as soon as arm 59 has left the end button. Energizing the locking solenoid projects the latch into its position to lock the turntable in fixed relation to the craft and the parts are then restored to their normal position with the gyroscope in steering relation to the craft.

While the invention has been described as a steering mechanism, it is obvious that it will also function to stabilize the craft against roll. While the disclosure has featured the gimbal rings horizontally disposed in their normal position, it is within the scope of the disclosure to locate them in any desired plane.

I claim:

1. The method of gyroscopically steering a rudderless vessel in a given plane which comprises developing rotational energy in the spinning rotor of a gyroscope rotating about an axis in said plane and displacing the axis from said plane to effect a precessional movement capable of steering the vessel about a self-contained vertical axis in the direction towards which the axis is depressed.

2. The method of gyroscopically steering a rudderless vessel in a given plane which comprises developing rotational energy in the spinning rotor of a gyroscope rotating about an axis in said plane and displacing the axis from said plane to effect a precessional movement capable of steering the vessel about a self-contained vertical axis in the direction towards which the axis is depressed, and imposing a dampening effect on the displacing force acting on the axis.

3. In the art of turning a craft in space about a vertical axis passing therethrough, the method which consists in imposing on the craft a torque developed about said axis as the result of the precessional forces of an active gyroscope resulting from an external force displacing its gimbal ring from the plane in which it is normally disposed.

4. In the art of maintaining a craft on its course while under the influence of external forces which are tending to cause it to veer off its course, the method which consists in subjecting the craft to the influence of a gyroscopic force operating to restore the craft to its course and which gyroscopic force is controlled automatically by those forces which are acting at the time to cause the craft to move off its course.

5. In the art of steering a freely floating body in space and which body is free of the usual steering rudders, the method which includes the art of applying to the body that gyroscopic force effective when its spinning rotor is displaced from normal.

6. In a device of the class described, the combination with a craft capable of turning about a vertical axis even in the absence of external steering means, of mechanism for turning the craft about said axis even when the craft is without linear motion and thus when the axis is stationary relative to the earth, said mechanism including a steering gyroscope secured to the craft with the craft providing one of the three degrees of freedom for its spinning rotor and the other two degrees of freedom being in the gyroscope structure, a pair of main solenoids having their cores operatively connected to opposite ends of a spinning axis of the steering gyroscope to tilt the same, one when powered to tilt the same clockwise and the other when powered to tilt the axis counterclockwise, a control gyroscope, means forming a first solenoid circuit including the left main solenoid, means forming a second solenoid circuit including the right main solenoid, and a circuit closer having a shiftable contact connected to the gimbal ring of the control solenoid and movable thereby as the ring tilts in one direction to close the first solenoid circuit and when the ring tilts in the opposite direction to close the current through the second circuit.

7. In a device of the class described, the combination with a craft capable of turning about an axis which may be fixed relative to the earth, of gyroscopically energized mechanism for turning the craft about said axis, said mechanism including a gyroscope secured to the craft with the craft providing one of the three degrees of freedom for its spinning rotor and said gyroscope having means providing for the other two degrees of freedom, electro-magnetically actuated means operatively connected to the axis of the spinning rotor of the gyroscope to impose thereon selectively a forced precession downwardly to cause the craft to turn toward the right, or downwardly on the other side to cause the craft to turn to the left about said axis, and control means for selectively energizing said electro-magnetically actuated means to effect a right or left turning of the craft.

8. The combination of a craft capable of turning in space about a vertical axis, a gyroscope including a support fixed to the craft, a gimbal ring journaled in the support and normally disposed in a horizontal plane, a spinning rotor and an axle therefor journaled in the ring, a pair of solenoids operatively connected to the ring for selectively moving a portion of the ring to which it is attached in the same vertical direction and thus act to displace the ring and the rotor from their normal planes, and means forming a solenoid circuit including said solenoids and control means for causing one solenoid to function while the other solenoid remains idle.

9. In combination with a craft capable of moving freely in a horizontal plane, gyroscopic mechanism for steering the craft, said mechanism including a support rigidly attached to the craft, a gimbal ring normally disposed in a horizontal plane, an axle therefor journaled in the ring and disposed athwart the ship, a spinning rotor carried by the axle, means for journaling the ring in the support to permit a freedom of oscillation of the ring about an axis at right angles to the axis of the axle, and means for imposing a force on the ring in a tendency to tilt it and with it the rotor out of their normal position and thus cause the ship to steer in the direction towards which the ring is depressed and so long as it is so depressed.

10. In combination with a body free to turn in space about a vertical first axis, a gyroscopically controlled mechanism for turning the body about said axis, including a binnacle rigidly secured to the body, a gimbal ring normally disposed in a horizontal plane and journaled in the binnacle for freedom of movement about a second axis, an axle disposed in a third axis at right angles to the second axis, trunnions mounting the opposite ends of the axle in the ring, a spinning rotor carried by the axle and turning in the plane containing the second axis, vertically directed control means acting on the ring at one of the trunnions for selectively tilting the ring from its normal horizontal plane, thereby to impose a couple on the axle for turning the body in space about its first or vertical axis and in that direction whichever may be on the depressed side of the ring, and means tending to restore the ring to its normal horizontal position when free from the displacing effect of the control means.

11. In combination with a body free to turn in space about a vertical first axis, a gyroscopically controlled mechanism for turning the body about said axis, including a binnacle rigidly secured to the body, a gimbal ring normally disposed in a horizintal plane and journaled in the binnacle for freedom of movement about a second axis, an axle disposed in a third axis at right angles to the second axis, trunnions mounting the opposite ends of the axle in the ring, a spinning rotor carried by the axle and turning in the plane containing the second axis, and vertically directed control means acting on the ring at one of the trunnions for selectively tilting the ring from its normal horizontal plane, thereby to impose a couple on the axle for turning the body in space about its first or vertical axis and in that direction whichever may be on the depressed side of the ring.

12. In a device for steering a craft comprising a support, a gyroscope provided with means for securing it rigidly to the craft, said gyroscope having its gimbal ring normally disposed in a horizontal plane and control means for tilting the gimbal ring to shift the axis of spin of its associated spinning rotor and thus to effect a steering of the craft in the direction towards the depressed side of the ring.

13. A craft having a freedom of movement in space and thus capable of being steered at will selectively to port or starboard to follow a new course and capable of being restored automatically to a preset course on any tendency to depart towards either port or starboard from said preset course, a steering gyroscope having its support fixed to the craft, a gimbal ring journalled in the support and normally disposed in a horizontal plane and a spinning rotor having its axle journaled in the ring and normally disposed with its axis athwart the craft, a pair of solenoids having their cores connected to the ring at the trunnions of the rotor axis and circuit forming means including the solenoids and a two-way switch in said circuit, including a movable element operating between two fixed contacts, a control gyroscope for controlling said movable element and the two fixed contacts being in electric circuit respectively with the two solenoids, whereby a precessional movement of the control gyroscope in one direction will close the circuit through one of the solenoids and a movement in the opposite direction will close the circuit through the other solenoid.

14. The combination with a body free to turn in space in a horizontal plane about a self-contained vertical axis, of mechanism for so turning the body, said mechanism comprising a gyroscope including a gimbal ring mounted to turn about an axis fixed relative to the body and which axis is at all times disposed in a horizontal plane, and a spinning rotor mounted in the ring for rotation about an axis at right angles to the first named axis, and means for imposing a precessional movement on said gimbal ring.

15. The structure defined in claim 14 and in which said last named means includes another gyroscope also mounted on the body and responsive automatically to a turning of the body about said vertical axis.

16. The combination with a floating body free to turn in space in a horizontal plane and substantially restrained from moving in any other plane, of mechanism for steering the body, comprising a gyroscope including a gimbal ring mounted for rotation about an axis fixed to the body and thus substantially restrained to a horizontal plane and having a high speed spinning body mounted in the ring to turn about an axis at right angles to the first named axis, and having capacity to turn the body by reason of the gyroscopic force generated thereby to turn the body, and means engaging the gimbal ring to impose a force thereon to give it a precessional movement, and except for said last named means, said ring being otherwise free of any other device.

17. The combination of a body free to turn in space, gyroscopically actuated mechanism constituting the sole means for turning the body, said mechanism including a gyroscope comprising a gimbal ring and a spinning rotor journaled conventionally in the ring, and a mounting for fixing the axis of turn of the gimbal ring relative to the body whereby two of the degrees of freedom of the gyroscope are in the gyroscope itself and the third degree of freedom is in the body, and means for imposing a force on said gimbal ring to tilt it about its axis of turn and thus impose a forced precessional on said gimbal ring.

18. The device defined in claim 17 and in which said last named means includes a servo gyroscope carried by the body and controlled by the turning of the body in space.

19. The device defined in claim 17 and in which said servo gyroscope acts through an electro-magnetically actuated device for restoring said servo gyroscope to its normal inoperative position after it has functioned.

20. A steering device for restoring a craft automatically to its course when veering off its course by external influences, the combination of a main gyroscope including a main gimbal ring normally disposed in a horizontal plane, a solenoid operatively connected to tilt the main ring about its axis of turn in one direction, a servo gyroscope including a servo gimbal ring normally disposed in a horizontal plane, means forming a main solenoid circuit including a solenoid circuit closer comprising a fixed contact and a shiftable contact moved by the tilting of the servo ring, a conductor connecting the fixed contact with the windings of the solenoid, and means for restoring the servo ring to its normal horizontal position after the solenoid circuit has been closed momentarily, said means including an electro-magnet with its armature carried by the servo ring, means forming an electro-magnet circuit including an electro-magnetic circuit closer comprising a fixed contact and a movable contact carried by the servo ring and a conductor leading from the fixed contact to one end of the windings of the electro-magnet.

21. A steering device for restoring a craft automatically to its course when veering off its course by external influences, the combination of a main gyroscope including a main gimbal ring normally disposed in a horizontal plane, a solenoid operatively connected to tilt the main ring about its axis of turn in one direction, a servo gyroscope including a servo gimbal ring normally disposed in a horizontal plane, means forming a main solenoid circuit including a solenoid circuit closer comprising a fixed contact and a shiftable contact moved by the tilting of the servo ring, and a conductor connecting the fixed contact with the windings of the solenoid.

22. In a device for automatically restoring a craft to its course when acting under forces tending to veer it off its course, the combination of a main gyroscope, a solenoid operatively connected thereto to give it a precessional movement, a servo gyroscope, means forming a solenoid circuit including the solenoid and a circuit closer whose movable element is controlled by the servo gyroscope, electromagnetic means for restoring the servo gyroscope to a normal position, said means including an electro-magnet whose armature is movable with the gimbal ring of the servo gyroscope, means forming an electro-magnet circuit closer whose movable element is controlled by the servo gyroscope and a conductor leading from its fixed contact to one end of the windings of the electro-magnet.

23. In a device for turning a craft about an axis of turn, the combination of two gyroscopes having their gimbal rings normally disposed in parallel planes both normal to said axis of turn, a link connecting one end of the axle trunnion of one of the gyroscopes with the opposite end of the axle trunnion of the other gyroscope to tilt the rings in unison, a pair of supports, one for each gyroscope and to which its associate gimbal ring is journaled, and means for rigidly securing one of the supports to the craft to be steered and means for rotating the other support about said axis of turn to cause its associated ring to tilt from its normal plane and thus cause the other gyroscope to turn the craft to which the support is fixed.

24. The combination of a craft capable of turning in space about a vertical axis, a mechanism for steering the craft comprising two gyroscopes in superimposed relation with their gimbal rings normally disposed in horizontal planes, the lower gyroscope having its gimbal ring mounted in a support secured rigidly to the craft, linkage connecting one side of one of the gimbal rings to the opposite side of the other gimbal ring to cause the rings to tilt in unison in opposite directions, and means connected to one of the gimbal rings at one end of its associated rotor axle to shift the gimbal ring and thus its companion to and from their normal horizontal positions.

25. A gyroscopic steering device comprising a pair of superimposed gyroscopes, each including a support, a gimbal ring journaled in the support and normally disposed in a horizontal plane and a spinning body having its axle journaled in the ring, means coupling one of the gimbal rings to the other to cause them to tilt in unison, means for securing one of the supports rigidly to the craft to be steered so that the craft is free to provide one of the three freedoms of movement of one of the gyroscopes, and means for rotating the other support about a vertical axis to cause a precessional movement of its associated gyroscope.

26. The combination of a craft free to turn in space about a vertical axis, a gyroscope carried by the craft and providing two degrees of rotational freedom of its spinning motor, the third degree of freedom being provided by the craft, and control means operatively responsive to any tilting of the spinning body out of its normal plane of rotation for imposing on the spinning body a force tending to further tilt the spinning body out of its normal plane of rotation.

27. The combination of a craft free to turn in space about a vertical axis, a gyroscope carried by the craft, means tending to restore the craft to its preset course when acted upon by external influences tending to cause the craft to veer off its course, said means operatively controlled by the gyroscope to impose a force on its gimbal ring to move it in the same direction in which it was tilted by the action of the craft in so veering off its course.

28. The combination of a body free to turn in space, mechanism for steering said body comprising two gyroscopes each including a gimbal ring whose axis of turn is fixed relative to the body and are disposed parallel to each other, a linkage connecting the two gimbal rings to cause one to turn the other, a pair of trunnions fixed to the body for supporting one of the gyroscopes, a support mounted for rotation about a vertical axis for supporting the other gyroscope, a reversible electric motor for turning said support, and means for controlling the reversibility of said electric motor.

29. The structure defined in claim 28 and in which said last named means includes a motor reversing device, a third gyroscope and means forming a motor circuit including said motor, said reversing device and said third gyroscope.

30. The combination of a body free to turn in space, mechanism for steering said body, said mechanism including a gyroscope, a control for the gyroscope for imposing a precessional movement on its gimbal ring, and including a reversible electric motor, a reversible switch for controlling the direction of rotation of the motor and a control gyroscope operatively connected to said reversible switch whereby the direction of tilt of the gyroscope gimbal ring is controlled selectively by the movement towards starboard or port of the body.

31. The combination of a body free to turn in space, gyroscopically energized means for steering the body, said means including a gyroscope having sufficient power capacity to turn the body when a force is applied to the gimbal ring of the gyroscope sufficient to effect such steering, and means for applying such force.

32. The combination of a body free to turn in space, a turntable mounted on the body for rotation about a vertical axis, a gyroscope mounted on the turntable and acting normally on the body to steer the same, means acting to lock the turntable to the body, and means controlled by the movement of the gyroscope gimbal ring into an extreme tilted position to release the locking means.

33. The combination of a body free to turn in space, a turntable mounted on the body for rotation about a vertical axis, a gyroscope mounted on the turntable and acting normally on the body to steer the same, means acting to lock the turntable to the body, means controlled by the movement of the gyroscope gimbal ring into an extreme tilted position to release the locking means, and means controlled automatically by the movement of the gimbal ring into its normal position to lock the turntable to the body.

34. The combination of a support, a turntable mounted on the support, means including a locking latch for locking the turntable to the support, a gyroscope mounted on the turntable, and electromagnetically actuated means controlled by the movement of the gyroscope for moving the latch to and from its operative locking position.

CHARLES M. HAYMAN.